United States Patent
Zhao et al.

(10) Patent No.: US 10,602,524 B2
(45) Date of Patent: Mar. 24, 2020

(54) RESOURCE SCHEDULING METHOD AND DEVICE FOR VEHICLE INFRASTRUCTURE COOPERATIVE COMMUNICATION SYSTEM, AND NODE OF VEHICLE INFRASTRUCTURE COOPERATIVE COMMUNICATION SYSTEM

(71) Applicant: CHINA ACADEMY OF TELECOMMUNICATIONS TECHNOLOGY, Beijing (CN)

(72) Inventors: Li Zhao, Beijing (CN); Jiye Tang, Beijing (CN); Jiayi Fang, Beijing (CN); Yuan Feng, Beijing (CN); Lin Lin, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 54 days.

(21) Appl. No.: 15/768,420

(22) PCT Filed: Nov. 4, 2016

(86) PCT No.: PCT/CN2016/104657
§ 371 (c)(1),
(2) Date: Apr. 13, 2018

(87) PCT Pub. No.: WO2017/079348
PCT Pub. Date: May 11, 2017

(65) Prior Publication Data
US 2018/0310296 A1    Oct. 25, 2018

(30) Foreign Application Priority Data
Nov. 5, 2015    (CN) .......................... 2015 1 0746136

(51) Int. Cl.
*H04W 4/00* (2018.01)
*H04W 72/04* (2009.01)
(Continued)

(52) U.S. Cl.
CPC ......... *H04W 72/048* (2013.01); *H04W 4/027* (2013.01); *H04W 4/40* (2018.02); *H04W 72/00* (2013.01); *H04W 72/0413* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| 5,909,649 A | * | 6/1999 | Saunders | ............. H01Q 3/2605 455/450 |
| 2005/0025093 A1 | * | 2/2005 | Yun | ........................ H04W 76/10 370/328 |

(Continued)

FOREIGN PATENT DOCUMENTS

| CN | 101400133 A | 4/2009 |
| CN | 103703849 A | 4/2014 |

(Continued)

OTHER PUBLICATIONS

Extended European Search Report for EP 16861616.7, dated Sep. 20, 2018.
(Continued)

*Primary Examiner* — Zewdu A Beyen
(74) *Attorney, Agent, or Firm* — Ladas & Parry, LLP (57) ABSTRACT

The present disclosure provides in some embodiments a resource scheduling method and a resource scheduling device for a vehicle infrastructure cooperative communication system, and a node of the vehicle infrastructure cooperative communication system. According to the present disclosure, a movement trend between nodes is determined
(Continued)

in accordance with node position information, so as to spatially multiplex time-frequency resources and prevent the frequent adjustment of time-frequency resources, thereby to reduce signaling overhead for allocating the time-frequency resources and improve utilization of the time-frequency resources.

16 Claims, 6 Drawing Sheets

(51) Int. Cl.
*H04W 72/00* (2009.01)
*H04W 4/40* (2018.01)
*H04W 4/02* (2018.01)

(56) References Cited

U.S. PATENT DOCUMENTS

2008/0165727 A1 7/2008 He et al.
2012/0134336 A1 5/2012 Nakaya et al.
2016/0381539 A1 12/2016 Park et al.

FOREIGN PATENT DOCUMENTS

| CN | 103716898 A | 4/2014 | |
|----|----|----|----|
| CN | 104981021 A | 10/2015 | |
| EP | 2779726 A1 | 9/2014 | |
| EP | 2930989 A1 | 10/2015 | |
| WO | WO-2014194487 A1 * | 12/2014 | ......... H04N 21/2385 |
| WO | 2015147376 A1 | 10/2015 | |

OTHER PUBLICATIONS

Written Opinion of the International Search Authority for PCT/CN2016/104657 dated Jan. 25, 2017 and its English translation provided by WIPO.
International Preliminary Report on Patentability for PCT/CN2016/104657, dated May 8, 2018, and its English translation provided by WIPO.
International Search Report for PCT/CN2016/104657 dated Jan. 25, 2017 and its English translation provided by WIPO.
Written Opinion of the International Search Authority PCT/CN2016/104657 dated Jan. 25, 2017 and its English translation provided by Google Translate.

* cited by examiner

RESOURCE SCHEDULING METHOD AND DEVICE FOR VEHICLE INFRASTRUCTURE COOPERATIVE COMMUNICATION SYSTEM, AND NODE OF VEHICLE INFRASTRUCTURE COOPERATIVE COMMUNICATION SYSTEM

CROSS-REFERENCE TO RELATED APPLICATIONS

The present application is the U.S. national phase of PCT Application PCT/CN2016/104657 filed on Nov. 4, 2016 which claims a the priority to Chinese patent application No. 201510746136.1 filed on Nov. 5, 2015, the disclosures of which are incorporated herein by reference in their entireties.

TECHNICAL FIELD

The present disclosure relates to a vehicle infrastructure cooperative communication system, in particular to a resource scheduling method and a resource scheduling device for the vehicle infrastructure cooperative communication system, and a node of the vehicle infrastructure cooperative communication system.

BACKGROUND

Vehicle infrastructure cooperative technique is used to perform dynamic, real-time information interaction between vehicles and between a vehicle and an infrastructure using such technologies as radio communication technology and a new-generation Internet technology, and perform active security control over the vehicles and cooperative management over the infrastructures on the basis of collecting and integrating dynamic traffic information in a full-time-space manner, so as to achieve effective cooperation among persons, vehicles and the infrastructures, ensure the traffic safety and improve the traffic efficiency, thereby to provide a safe, efficient and environmentally friendly traffic system.

For a vehicle infrastructure cooperative communication system, it is necessary to provide low time delay and high reliability for a road safety application. In addition, on the premise of controlling interference and ensuring reception reliability, it is able to provide an appropriate spatial multiplexing distance, so as to enable a plurality of nodes to transmit information simultaneously using an identical time-frequency resource (i.e., achieve spatial multiplexing of the time-frequency resource in the vehicle infrastructure cooperative communication system), thereby to improve the utilization of the system resource.

SUMMARY

An object of the present disclosure is to provide a resource scheduling method and a resource scheduling device for a vehicle infrastructure cooperative communication system, and a node of the vehicle infrastructure cooperative communication system, so as to prevent the frequent adjustment of the time-frequency resource, and improve the utilization of the time-frequency resource.

In one aspect, the present disclosure provides in some embodiments a resource scheduling method for a vehicle infrastructure cooperative communication system, including steps of: receiving node position information from nodes of the vehicle infrastructure cooperative communication system; calculating a distance between the nodes in accordance with the node position information, and determining a movement trend between the nodes, the movement trend indicating that the distance decreases, remains unchanged or increases; in the case that the movement trend indicates that the distance decreases or increases, determining whether or not spatial-multiplexed time-frequency resources are capable of being used for the nodes in accordance with the distance between the nodes and the movement trend, so as to acquire a determination result; and allocating available time-frequency resources for the nodes in accordance with the determination result.

In a possible embodiment of the present disclosure, subsequent to the step of determining the movement trend between the nodes, the resource scheduling method further includes, in the case that the movement trend indicates that the distance remains unchanged, maintaining the time-frequency resources currently allocated for a first node and a second node.

In a possible embodiment of the present disclosure, in the case that the movement trend indicates that the distance decreases or increases, the step of determining whether or not the spatial-multiplexed time-frequency resources are capable of being used for the nodes in accordance with the distance between the nodes and the movement trend includes: in the case that the movement trend indicates that the distance increases and a current distance between the first node and the second node is greater than a predetermined spatial multiplexing distance threshold, determining that the spatial-multiplexed time-frequency resources are capable of being used for the first node and the second node, otherwise determining that the spatial-multiplexed time-frequency resources are incapable of being used for the first node and the second node; and in the case that the movement trend indicates that the distance decreases and the current distance between the first node and the second node is greater than a first sum, determining that the spatial-multiplexed time-frequency resources are capable of being used for the first node and the second node, otherwise determining that the spatial-multiplexed time-frequency resources are incapable of being used for the first node and the second node, the first sum being a sum of the spatial multiplexing distance threshold and a predetermined buffer distance.

In a possible embodiment of the present disclosure, the step of allocating the available time-frequency resources for the nodes in accordance with the determination result includes: in the case that the spatial-multiplexed time-frequency resources are capable of being used for the first node and the second node, allocating an identical time-frequency resource for the first node and the second node; and in the case that the spatial-multiplexed time-frequency resources are incapable of being used for the first node and the second node, allocating different time-frequency resources for the first node and the second node.

In a possible embodiment of the present disclosure, the step of calculating the distance between the nodes in accordance with the node position information and determining the movement trend between the nodes includes: calculating a distance between the first node and the second node in accordance with node position information about the first node and the second node; and determining a variation trend of the distance in accordance with the distances acquired after two calculation operations, so as to acquire the movement trend between the first node and the second node.

In a possible embodiment of the present disclosure, in the case of receiving the node position information from the nodes of the vehicle infrastructure cooperative communication system, the resource scheduling method further includes receiving node running information from the nodes of the vehicle infrastructure cooperative communication system, the node running information at least including a movement speed of each node. The step of calculating the distance between the nodes in accordance with the node position information and determining the movement trend between the nodes includes: calculating a distance between the first node and the second node in accordance with node position information about the first node and the second node; and determining the movement trend between the first node and the second node in accordance with the node position information about the first node and the second node and the node running information.

In a possible embodiment of the present disclosure, the step of determining the movement trend between the first node and the second node in accordance with the node position information about the first node and the second node and the node running information includes: determining a relative speed of the first node relative to the second node in accordance with a speed of the first node and a speed of the second node; and determining the movement trend between the first node and the second node in accordance with the relative speed of the first node relative to the second node.

In another aspect, the present disclosure provides in some embodiments a resource scheduling method for a vehicle infrastructure cooperative communication system, including steps of: reporting, by each node of the vehicle infrastructure cooperative communication system, node position information about the node to a scheduling platform; receiving, by each node, a time-frequency resource allocated by the scheduling platform for the node, the time-frequency resource being allocated by the scheduling platform for the node in accordance with a distance between the nodes calculated in accordance with the node position information from the nodes and a movement trend between the nodes; and transmitting, by each node, information through the time-frequency resource allocated by the scheduling platform.

In a possible embodiment of the present disclosure, in the case of reporting, by each node, the node position information about the node to the scheduling platform, the resource scheduling method further includes reporting, by each node, node running information to the scheduling platform so that the scheduling platform determines the movement trend between the nodes in accordance with the node running information, the node running information at least including a movement speed of each node.

In another aspect, the present disclosure provides in some embodiments a resource scheduling device for a vehicle infrastructure cooperative communication system, including: a reception module configured to receive node position information from nodes of the vehicle infrastructure cooperative communication system; a first determination module configured to calculate a distance between the nodes in accordance with the node position information, and determine a movement trend between the nodes, the movement trend indicating that the distance decreases, remains unchanged or increases; a second determination module configured to, in the case that the movement trend indicates that the distance decreases or increases, determine whether or not spatial-multiplexed time-frequency resources are capable of being used for the nodes in accordance with the distance between the nodes and the movement trend, so as to acquire a determination result; and an allocation module configured to allocate available time-frequency resources for the nodes in accordance with the determination result.

In a possible embodiment of the present disclosure, the allocation module is further configured to, in the case that the movement trend indicates that the distance remains unchanged, maintain the time-frequency resources currently allocated for a first node and a second node.

In a possible embodiment of the present disclosure, the second determination module includes: a first output module configured to, in the case that the movement trend indicates that the distance increases and a current distance between the first node and the second node is greater than a predetermined spatial multiplexing distance threshold, determine that the spatial-multiplexed time-frequency resources are capable of being used for the first node and the second node, otherwise determine that the spatial-multiplexed time-frequency resources are incapable of being used for the first node and the second node; and a second output module configured to, in the case that the movement trend indicates that the distance decreases and the current distance between the first node and the second node is greater than a first sum, determine that the spatial-multiplexed time-frequency resources are capable of being used for the first node and the second node, otherwise determine that the spatial-multiplexed time-frequency resources are incapable of being used for the first node and the second node, the first sum being a sum of the spatial multiplexing distance threshold and a predetermined buffer distance.

In a possible embodiment of the present disclosure, the allocation module includes: a first allocation sub-module configured to, in the case that the spatial-multiplexed time-frequency resources are capable of being used for the first node and the second node, allocate an identical time-frequency resource for the first node and the second node; and a second allocation sub-module configured to, in the case that the spatial-multiplexed time-frequency resources are incapable of being used for the first node and the second node, allocate different time-frequency resources for the first node and the second node.

In a possible embodiment of the present disclosure, the first determination module includes: a first calculation module configured to calculate a distance between the first node and the second node in accordance with node position information about the first node and the second node; and a first acquisition module configured to determine a variation trend of the distance in accordance with the distances acquired after two calculation operations, so as to acquire the movement trend between the first node and the second node.

In a possible embodiment of the present disclosure, the reception module is further configured to, in the case of receiving the node position information from the nodes of the vehicle infrastructure cooperative communication system, receive node running information from the nodes of the vehicle infrastructure cooperative communication system, the node running information at least including a movement speed of each node. The step first determination module includes: a second calculation module configured to determine a relative speed of the first node relative to the second node in accordance with a speed of the first node and a speed of the second node; and a second acquisition module configured to determine the movement trend between the first node and the second node in accordance with the relative speed of the first node relative to the second node.

In still yet another aspect, the present disclosure provides in some embodiments a resource scheduling device for a vehicle infrastructure cooperative communication system, including a receiver, a processor and a memory. The receiver is configured to receive node position information from nodes of the vehicle infrastructure cooperative communication system. The processor is configured to read programs stored in the memory, so as to: calculate a distance between the nodes in accordance with the node position information, and determine a movement trend between the nodes, the movement trend indicating that the distance decreases, remains unchanged or increases; in the case that the movement trend indicates that the distance decreases or increases, determine whether or not spatial-multiplexed time-frequency resources are capable of being used for the nodes in accordance with the distance between the nodes and the movement trend, so as to acquire a determination result; and allocate available time-frequency resources for the nodes in accordance with the determination result. The memory is configured to store therein data for the operation of the processor.

In still yet another aspect, the present disclosure provides in some embodiments a node of a vehicle infrastructure cooperative communication system, including: a first transmission module configured to report node position information about the node to a scheduling platform; a reception module configured to receive a time-frequency resource allocated by the scheduling platform for the node, the time-frequency resource being allocated by the scheduling platform for the node in accordance with a distance between the node and another node calculated in accordance with the node position information from the nodes and a movement trend between the nodes; and a second transmission module configured to transmit information through the time-frequency resource allocated by the scheduling platform.

In a possible embodiment of the present disclosure, the first transmission module is further configured to, in the case of reporting the node position information about the node to the scheduling platform, report node running information to the scheduling platform so that the scheduling platform determines the movement trend between the nodes in accordance with the node running information, the node running information at least including a movement speed of each node.

In still yet another aspect, the present disclosure provides in some embodiments a node of a vehicle infrastructure cooperative communication system, including a processor and a memory. The processor is configured to read programs stored in the memory, so as to: report node position information about the node to a scheduling platform; receive a time-frequency resource allocated by the scheduling platform for the node, the time-frequency resource being allocated by the scheduling platform for the node in accordance with a distance between the node and another node calculated in accordance with the node position information from the nodes and a movement trend between the nodes; and transmit information through the time-frequency resource allocated by the scheduling platform. The memory is configured to store therein data for the operation of the processor.

According to the embodiments of the present disclosure, the movement trend between the nodes is determined in accordance with the node position information, and then the spatial multiplexing operation is performed in accordance with the movement trend. As a result, it is able to optimize a spatial multiplexing policy of the time-frequency resources, reduce the possibility of resource allocation collision, and reduce the signaling overhead due to the frequent adjustment of the resources. In addition, it is able to effectively perform the spatial multiplexing operation on the time-frequency resources, and improve the utilization of the time-frequency resources.

DETAILED DESCRIPTION OF THE EMBODIMENTS

Usually, for a vehicle infrastructure cooperative communication system, in the case that a distance between nodes is greater than a predetermined spatial multiplexing distance, resources may be spatially multiplexed between the nodes in accordance with static position information about the nodes and the predetermined spatially multiplexing distance. In other words, whether or not to perform a spatial multiplexing operation is determined in accordance with a static positions reported by each node. In an actual scenario, usually each node is in motion, and a spatial multiplexing condition may not be met any longer due to a topological change. At this time, it is necessary to re-adjust the resource allocation, resulting in an increase in the signaling overhead for allocating resources.

An object of the present disclosure is to provide a resource scheduling method for a vehicle infrastructure cooperative communication system, so as to spatially multiplex time-frequency resources between the nodes through taking a possible movement trend between the nodes into consideration, thereby to prevent the frequent adjustment of the time-frequency resources, reduce the possibility of resource allocation collision, and improve the utilization of the system resources.

In order to make the objects, the technical solutions and the advantages of the present disclosure more apparent, the present disclosure will be described hereinafter in conjunction with the drawings and embodiments.

Usually, a vehicle infrastructure cooperative communication system in the embodiments of the present disclosure includes a scheduling platform and a plurality of nodes. The scheduling platform may be deployed within an evolved NodeB (eNB). To be specific, the scheduling platform may be deployed within one eNB having a certain coverage range, and it is capable of scheduling resources for the nodes within the coverage range of the eNB. Of course, the scheduling platform may also be deployed within more than one eNBs, and it is capable of scheduling the resources for the nodes within the coverage ranges of the eNBs.

Figure 1:
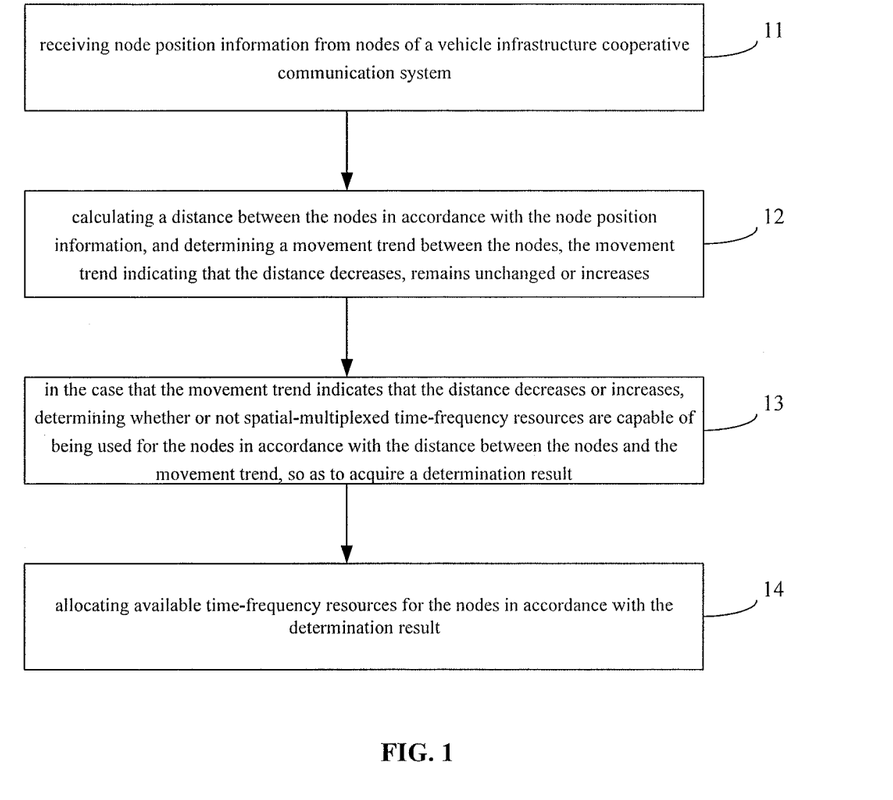
FIG. 1 is a flow chart of a resource scheduling method for a vehicle infrastructure cooperative communication system according to one embodiment of the present disclosure.

The present disclosure provides in some embodiments a resource scheduling method for a vehicle infrastructure cooperative communication system. The resource scheduling method is applied to a scheduling platform, and as shown in FIG. 1, it includes: Step 11 of receiving node position information from nodes of the vehicle infrastructure cooperative communication system; Step 12 of calculating a distance between the nodes in accordance with the node position information, and determining a movement trend between the nodes, the movement trend indicating that the distance decreases, remains unchanged or increases; Step 13 of, in the case that the movement trend indicates that the distance decreases or increases, determining whether or not spatial-multiplexed time-frequency resources are capable of being used for the nodes in accordance with the distance between the nodes and the movement trend, so as to acquire a determination result; and Step 14 of allocating available time-frequency resources for the nodes in accordance with the determination result.

In the above steps, each node may report the node position information to the scheduling platform via a signaling message. The scheduling platform may calculate the distance between the nodes in accordance with the node position information, determine the movement trend between the nodes, and determine whether or not an identical time-frequency resource is capable of being allocated for the nodes. Through taking the movement trend between the nodes into consideration while allocating the time-frequency resource, it is able to prevent the frequent adjustment of the time-frequency resources for the nodes, reduce the possibility of the resource allocation collision, and improve the utilization of the system resources.

In a possible embodiment of the present disclosure, Step 13 of determining whether or not the spatial-multiplexed time-frequency resources are capable of being used for the nodes includes: in the case that the movement trend indicates that the distance increases and a current distance between the first node and the second node is greater than a predetermined spatial multiplexing distance threshold, determining that the spatial-multiplexed time-frequency resources are capable of being used for the first node and the second node, otherwise determining that the spatial-multiplexed time-frequency resources are incapable of being used for the first node and the second node; and in the case that the movement trend indicates that the distance decreases and the current distance between the first node and the second node is greater than a first sum, determining that the spatial-multiplexed time-frequency resources are capable of being used for the first node and the second node, otherwise determining that the spatial-multiplexed time-frequency resources are incapable of being used for the first node and the second node, the first sum being a sum of the spatial multiplexing distance threshold and a predetermined buffer distance.

Here, the spatial multiplexing distance threshold is an empirical value preset in accordance with an interference distance of the time-frequency resource. Usually, in the case that the distance between the nodes is greater than the spatial multiplexing distance threshold, interference caused by the multiplexing of the time-frequency resources between the nodes may be within an acceptable range. In the case that the distance between the nodes is smaller than or equal to the spatial multiplexing distance threshold, the interference caused by the multiplexing of the time-frequency resources may go beyond the acceptable range. An actual value of the spatial multiplexing distance threshold may be acquired through simulation in a corresponding multiplexing scenario.

Here, the predetermined buffer distance is set with respect to a situation where the movement trend between the nodes indicates that the distance decreases. For example, in the case that the distance between the nodes is far larger than the spatial multiplexing distance threshold and the current movement trend between the nodes indicates that the distance decreases, it may take a certain time period for the distance between the nodes to reach the spatial multiplexing distance threshold. At this time, in order to improve the utilization of the time-frequency resources, the buffer distance may be provided, so that the time-frequency resources may be spatially multiplexed continuously between the nodes. In the case that the distance between the nodes is smaller than a sum of the buffer distance and the spatial multiplexing distance threshold, it is not advisable to spatially multiplex the time-frequency resources. A value of the buffer distance may be set in accordance with a scheduling frequency of the scheduling platform. For example, in the case of a larger scheduling frequency, a smaller buffer distance may beset, otherwise a larger buffer distance may be set. In addition, in the case of setting the buffer distance, a relative speed between the nodes may be further taken into consideration. The larger the relative speed, the larger the buffer distance, and vice versa.

In a possible embodiment of the present disclosure, in the case that the movement trend between the nodes determined in Step 12 indicates that the distance remains unchanged, the time-frequency resources currently allocated for a first node and a second node may be maintained continuously, until the movement trend between the nodes changes.

As shown in Table 1, in a possible embodiment of the present disclosure, each node may transmit its node position information, or both the node position information and node running information, to the scheduling platform (eNB) via signaling in accordance with a predetermined period. Of course, upon the receipt of a request from the scheduling platform, each node may immediately report the node position information and/or the node running information. The scheduling platform may perform the above Steps 11 to 14 in accordance with the information reported by each node.

TABLE 1

| Content | Content | Reporting mode |
|---|---|---|
| node position information | longitude, latitude, lane, and etc. | The node position information is reported by each node periodically, or immediately reported by each node upon the receipt of a request from the scheduling platform |
| node running information | speed, accelerated speed, direction, curvature, and etc. | The node running information is reported by each node periodically, or immediately reported by each node upon the receipt of a request from the scheduling platform |

In Step 12, the movement trend between the nodes may be determined in various modes, some of which will be described illustratively hereinafter. Of course, the following modes are for illustrative purposes only, but shall not be construed as limiting the present disclosure, i.e., the movement trend between the nodes may also be determined in any other modes.

Taking the first node and the second node as an example, in Step 12, a distance between the first node and the second node may be calculated in accordance with the node position information about the first node and the second node (i.e., information about the longitude, latitude and lane of each node). Then, a variation trend of the distance may be determined in accordance with the distances acquired after two calculation operations, so as to determine the movement trend between the first node and the second node. The movement trend indicates that the distance decreases, increases or remains unchanged.

For example, the distance between the nodes (i.e., a first distance) may be calculated in accordance with the node position information from the first node and the second node at a first time point, and then the distance between the nodes (i.e., a second distance) may be calculated in accordance with the node position information from the first node and the second node at a second time point. Next, whether or not the distance between the first node and the second increases, decreases or remains unchanged may be determined in accordance with the first distance and the second distance, so as to acquire the movement trend between the nodes.

In a possible embodiment of the present disclosure, the movement trend between the nodes may be further determined in accordance with the node running information reported by the nodes. In Step 11, apart from the node position information, the node running information may be further received from each node of the vehicle infrastructure cooperative communication system. The node running information at least includes such information as a movement speed of each node, an accelerated speed of each node, and a curvature, as shown in Table 1. Here, the speed and the accelerated speed are both vectors.

Figure 2:
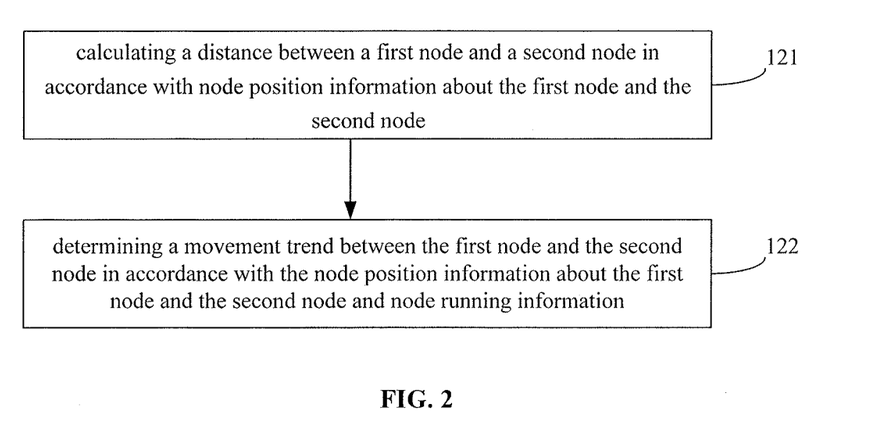
FIG. 2 is a flow chart of a step of calculating a distance between nodes and determining a movement trend between the nodes according to one embodiment of the present disclosure.

At this time, as shown in FIG. 2, Step 12 includes: Step 121 of calculating the distance between the first node and the second node in accordance with the node position information about the first node and the second node; and Step 122 of determining the movement trend between the first node and the second node in accordance with the node position information about the first node and the second node and the node running information, the movement trend indicating that the distance decreases, increases or remained unchanged.

Figure 3:
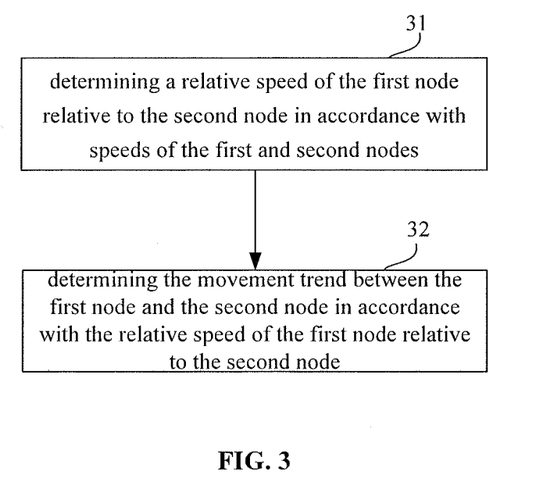
FIG. 3 is a flow chart of a step of determining the movement trend between the nodes according to one embodiment of the present disclosure.

As shown in FIG. 3, Step 122 of determining the movement trend between the first node and the second node includes: Step 31 of determining a relative speed of the first node relative to the second node in accordance with a speed of the first node and a speed of the second node; and Step 32 of determining the movement trend between the first node and the second node in accordance with the relative speed of the first node relative to the second node.

In the above steps, one of the nodes (e.g., the second node) is presumed to be in a stationary state, so a speed of the other node (e.g., the first node) relative to the second node is just the speed of the first node. At this time, a variation trend of the distance between the nodes may be determined in accordance with the speed of the first node.

The above modes for determining the movement trend are merely for illustrative purposes, and the present disclosure is not limited thereto. In other words, any modes capable of determining the movement trend between the nodes in accordance with the node position information and/or node running information may also be applicable.

After the movement trend between the nodes has been determined, in Step 13, whether or not the time-frequency resources are capable of being spatially multiplexed between the nodes may be determined in accordance with the distance between the nodes and the movement trend.

To be specific, 1) in the case that the current first distance between the first node and the second node is greater than the predetermined spatial multiplexing distance threshold and the movement trend between the first node and the second node indicates that the distance increases, the time-frequency resources may be capable of being spatially multiplexed between the first node and the second node, and otherwise the time-frequency resources may be incapable of being spatially multiplexed between the first node and the second node. 2) In the case that the current first distance between the first node and the second node is not greater than the predetermined spatial multiplexing distance threshold, the time-frequency resources may be incapable of being spatially multiplexed between the first node and the second node.

In the case that the time-frequency resources are capable of being spatially multiplexed between the first node and the second node, an identical time-frequency resource may be allocated for the first node and the second node for transmitting the information, so as to improve the utilization of the resources. In the case that the time-frequency resources are incapable of being spatially multiplexed between the first node and the second node, different time-frequency resources may be allocated for the first node and the second node, so as to reduce the possibility of resource allocation collision.

Figure 4:
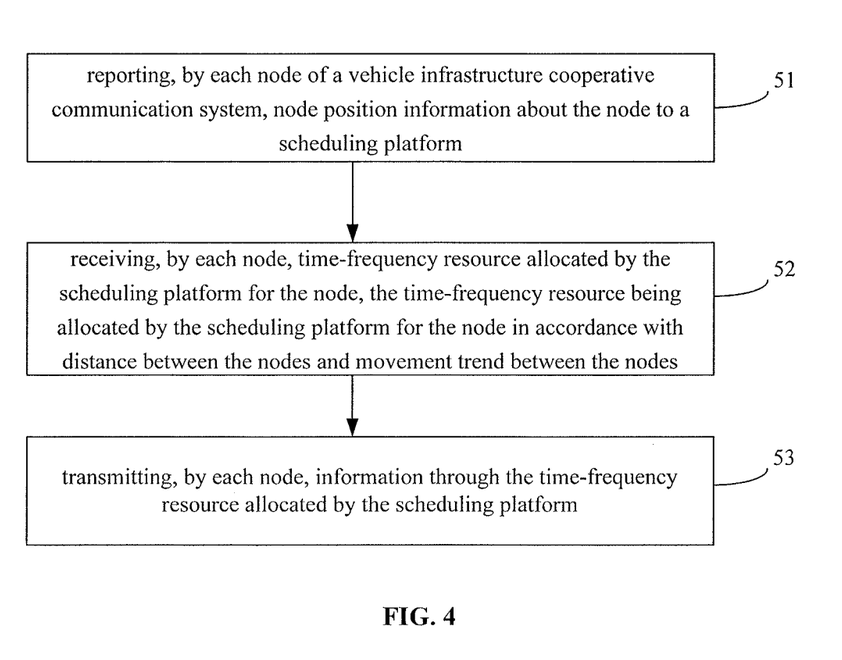
FIG. 4 is a flow chart of another resource scheduling method for a vehicle infrastructure cooperative communication system according to one embodiment of the present disclosure.

The above description refers to the allocation of the resources for the nodes at a scheduling platform side. Correspondingly, the present disclosure further provides in some embodiments a scheme at a node side. To be specific, the present disclosure further provides in some embodiments a resource scheduling method for a vehicle infrastructure cooperative communication system for use in a node. As shown in FIG. 4, the resource scheduling method includes: Step 51 of reporting, by each node of the vehicle infrastructure cooperative communication system, node position information about the node to a scheduling platform; Step 52 of receiving, by each node, a time-frequency resource allocated by the scheduling platform for the node, the time-frequency resource being allocated by the scheduling platform for the node in accordance with a distance between the nodes calculated in accordance with the node position information from the nodes and a movement trend between the nodes; and Step 53 of transmitting, by each node, information through the time-frequency resource allocated by the scheduling platform. For example, the information such as the node position information, the node running information and any other predefined information may be transmitted to the other node(s), so as to achieve the information interaction and sharing between vehicles.

In Step 51, in the case of reporting, by each node, the node position information about the node to the scheduling platform, node running information may be further reported by each node to the scheduling platform so that the scheduling platform determines the movement trend between the nodes in accordance with the node running information. The node running information at least includes a movement speed of each node.

According to the resource scheduling method in the embodiments of the present disclosure, the movement trend between the nodes may be determined in accordance with the node position information and the node running information, and whether or not the time-frequency resources are capable of being spatially multiplexed between the nodes may be determined in accordance with the movement trend, so as to reduce the signaling overhead due to the frequency adjustment of the resources. In addition, it is able to spatially multiple the time-frequency resources in accordance with the node position information and the node running information, thereby to improve the utilization of the time-frequency resources.

For ease of understanding, the present disclosure will be described hereinafter in conjunction with several scenarios. Each scenario includes one eNB and two nodes (vehicle A and vehicle B), and the eNB is provided with a scheduling platform of the vehicle infrastructure cooperative communication system.

(Scenario 1)

In this scenario, the movement trend between the nodes is determined in accordance with the node position information about the nodes.

Figure 5:
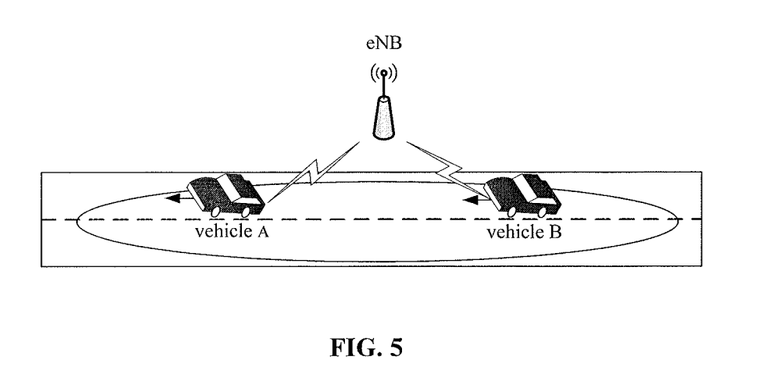
FIG. 5 through FIG. 9 are schematic views respectively showing illustrative application scenarios according to some embodiments of the present disclosure.

As shown in FIG. 5, the vehicles A and B are running in an identical direction on an identical lane of a road within a coverage range of the eNB, and the vehicle A is followed by the vehicle B.

At a first time point, the vehicles A and B may report the node position information for the first time. The eNB may store therein the node position information about the vehicles A and B, and calculate a distance between the vehicle A and the vehicle B, i.e., 1500 m, in accordance with the node position information. In one case, at a second time point, the vehicles A and B may report the node position information for the second time, and the distance between the vehicle A and the vehicle B calculated by the eNB is 1100 m (namely, the distance decreases). For example, within an time interval between the two reporting operations, the vehicle A runs forward for 100 m while the vehicle B runs forward for 500 m. The predetermined spatial multiplexing distance threshold is 900 m, so the current distance between the vehicles A and B meets the requirement on the spatial multiplexing distance. However, based on a variation trend of the distance, the movement trend between the vehicles A and B indicates that the distance decreases, so the eNB may determine that the time-frequency resources are incapable of being spatially multiplexed between the vehicles A and B.

In another case, at the second time point, the vehicles A and B may report the node position information for the second time, and the distance between the vehicle A and the vehicle B calculated by the eNB is 1900 m (namely, the distance increases). For example, within the time interval between the two reporting operations, the vehicle A runs forward for 500 m while the vehicle B runs forward for 100 m. The predetermined spatial multiplexing distance threshold is 900 m, so the current distance between the vehicles A and B meets the requirement on the spatial multiplexing distance. At this time, based on a variation trend of the distance, the movement trend between the vehicles A and B indicates that the distance increases, so the eNB may determine that the time-frequency resources are capable of being spatially multiplexed between the vehicles A and B.

(Scenario 2)

In this scenario, the movement trend between the nodes may be determined in accordance with the node position information and the node running information about the nodes, and the vehicles A and B are running away from each other in opposite directions.

Figure 6:
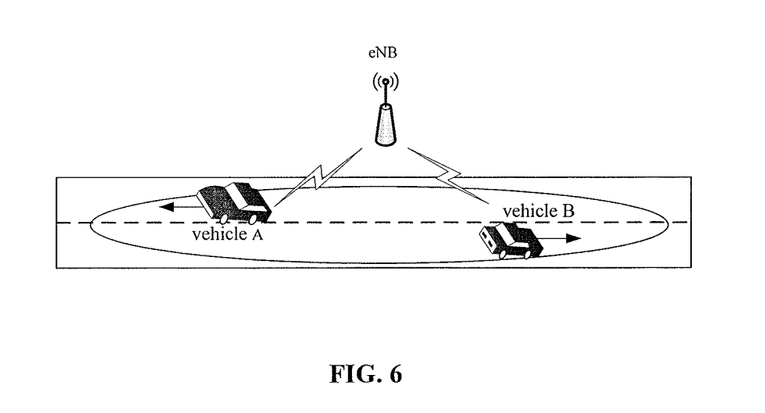

As shown in FIG. 6, the vehicles A and B are running in opposite directions on two lanes of the road within the coverage arrange of the eNB respectively.

At the first time point, the vehicles A and B may report the position information and the running information for the first time. The eNB may store therein the information, calculate the distance between the vehicles A and B, e.g., 1500 m, in accordance with the information, and acquire the running information about the vehicles A and B at the first time point (including a speed, an acceleration speed and a direction of each of the vehicles A and B).

At the second time point, the vehicles A and B may report the position information and the running information for the second time. The eNB may calculate the distance between the vehicles A and B in accordance with the updated position information, e.g., 2100 m (within the time interval, the vehicle A runs forward for 100 m while the vehicle B runs forward for 500 m). In addition, the eNB may acquire a running state of each vehicle in accordance with the position information and the running information. For example, the eNB may determine that the vehicles A and B are running in opposite directions, the vehicle A has a speed of 20 km/h and an accelerated speed of 2 m/s$^2$, and the vehicle B has a speed of 100 km/h and an accelerated speed of 2 m/s$^2$. In other words, the vehicles A and B are both running in an accelerated manner, and the movement trend between the vehicles A and B indicates that the distance increases. The predetermined spatial multiplexing distance is 900 m, so the distance between the vehicles A and B meets the requirement on the spatial multiplexing distance. Hence, the eNB may determine that the time-frequency resources are capable of being spatially multiplexed between the vehicles A and B.

(Scenario 3)

In this scenario, the movement trend between the nodes may be determined in accordance with the node position information and the node running information about the nodes. The vehicles A and B are running close to each other in opposite directions.

Figure 7:
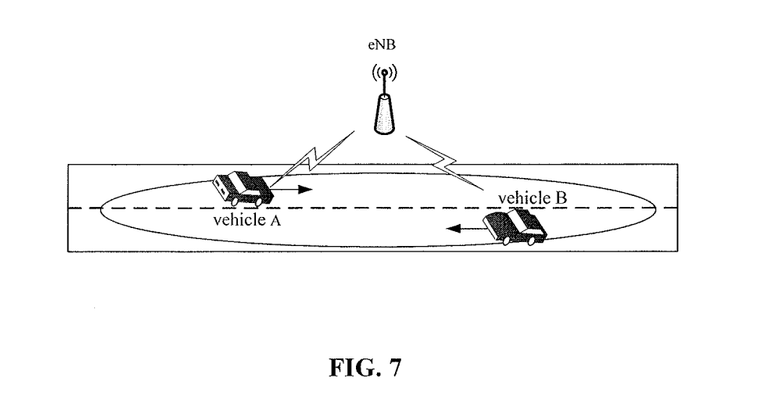

As shown in FIG. 7, the vehicles A and B are running close to each other in opposite directions on two lanes of the road within the coverage arrange of the eNB respectively.

At the first time point, the vehicles A and B may report the position information and the running information for the first time. The eNB may calculate the distance between the vehicles A and B, e.g., 1500 m, and acquire the running information about the vehicles A and B (including the speed, the accelerated speed and the direction).

At the second time point, the vehicles A and B may report the position information for the second time. The eNB may calculate the distance between the vehicles A and B in accordance with the updated position information, e.g., 1300 m (within the time interval, the vehicle A runs forward for 100 m while the vehicle B runs forward for 100 m). In addition, the eNB may acquire a running state of each vehicle in accordance with the running information. For example, the eNB may determine that the vehicles A and B are running in opposite directions, the vehicle A has a speed of 20 km/h and an accelerated speed of 2 m/s$^2$, and the vehicle B has a speed of 20 km/h and an accelerated speed of 2 m/s$^2$. In other words, the vehicles A and B are running in an accelerated manner, and the movement trend between the vehicles A and B indicates that the distance decreases. The predetermined spatial multiplexing distance is 900 m, so the distance between the vehicles A and B meets the requirement on the spatial multiplexing distance. However, because the movement trend between the vehicles A and B indicates that the distance decreases, the eNB may determine that the time-frequency resources are incapable of being spatially multiplexed between the vehicles A and B.

(Scenario 4)

In this scenario, the movement trend between the nodes may be determined in accordance with the node position information and the node running information about the nodes. The vehicles A and B are running in an identical direction.

Figure 8:
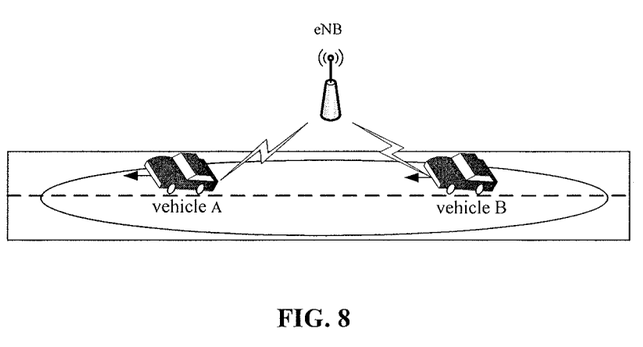

As shown in FIG. 8, the vehicles A and B are running in an identical direction on an identical lane of the road within the coverage range of the eNB.

At the first time point, the vehicles A and B may report the position information and the running information for the first time. The eNB may calculate the distance between the vehicles A and B, e.g., 1500 m, and acquire the running information about the vehicles A and B (including the speed, the accelerated speed and the direction).

At the second time point, the vehicles A and B may report the position information for the second time. The eNB may calculate the distance between the vehicles A and B in accordance with the updated position information, e.g., 1100 m (within the time interval, the vehicle A runs forward for 100 m while the vehicle B runs forward for 500 m). The predetermined spatial multiplexing distance is 900 m, so the distance between the vehicles A and B meets the requirement on the spatial multiplexing distance. In addition, the eNB may acquire a running state of each vehicle in accordance with the running information. For example, the eNB may determine that the vehicles A and B are running in an identical direction, the vehicle A has a speed of 20 km/h and an accelerated speed of −2 m/s$^2$, and the vehicle B has a speed of 100 km/h and an accelerated speed of 2 m/s$^2$. In other words, the vehicle A is running in a deaccelerated manner while the vehicle B is running an accelerated manner, so the movement trend between the vehicles A and B indicates that the distance decreases. At this time, although the distance between the vehicles A and B meets the requirement on the spatial multiplexing distance, the movement trend between the vehicles A and B indicates that the distance decreases, so the eNB may determine that the time-frequency resources are incapable of being spatially multiplexed between the vehicles A and B.

(Scenario 5)

In this scenario, the movement trend between the nodes may be determined in accordance with the node position information and the node running information about the nodes.

Figure 9:
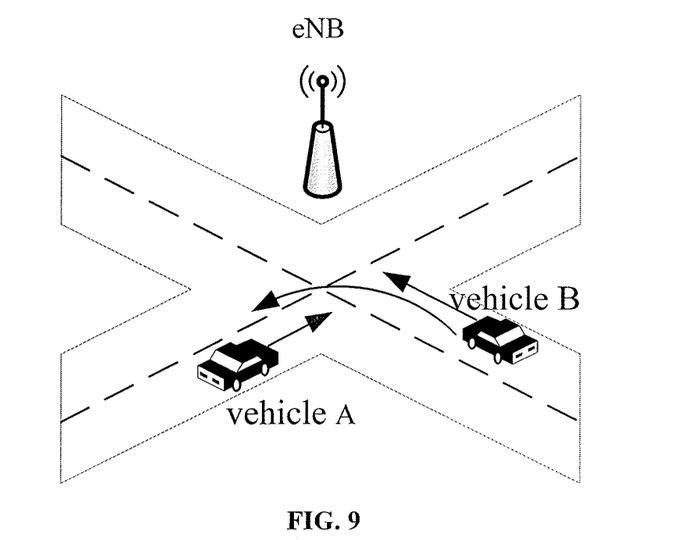

As shown in FIG. 9, the vehicles A and B are running on two lanes of different sections of crossroads within the coverage range of the eNB.

In a first circumstance, each of the vehicles runs forward directly without turning left or right.

At the first time point, the vehicles A and B may report the position information and the running information for the first time. The eNB may calculate the distance between the vehicles A and B, e.g., 1500 m, and acquire the running information about the vehicles A and B (including the speed, the accelerated speed and the direction).

At the second time point, the vehicles A and B may report the position information for the second time. The eNB may calculate the distance between the vehicles A and B in accordance with the updated position information, e.g., 1250 m (within the time interval, the vehicle A runs forward for 100 m while the vehicle B runs forward for 100 m). In addition, the eNB may acquire a running state of each vehicle in accordance with the running information. For example, the eNB may determine that a running direction of the vehicle A is about to intersect a running direction of the vehicle B, the vehicle A has a speed of 20 km/h and an accelerated speed of 2 m/s$^2$, and the vehicle B has a speed of 20 km/h and an accelerated speed of 2 m/s$^2$. In other words, each of the vehicles A and B is running in an accelerated manner, so the movement trend between the vehicles A and B indicates that the distance decreases. The predetermined spatial multiplexing distance is 900 m, so the distance between the vehicles A and B meets the requirement on the spatial multiplexing distance. However, the movement trend between the vehicles A and B indicates that the distance decreases, so the eNB may determine that the time-frequency resources are incapable of being spatially multiplexed between the vehicles A and B.

In a second circumstance, the vehicle B is about to turn left. In other words, the vehicles A and B are running on two lanes of different sections of the crossroads within the coverage range of the eNB, and the vehicle B is about to turn left.

At the second time point, the vehicles A and B may report the position information for the second time. The eNB may calculate the distance between the vehicles A and B in accordance with the updated position information, e.g., 1250 m (within the time interval, the vehicle A runs forward for 100 m while the vehicle B runs forward for 100 m). In addition, the eNB may acquire a running state of each vehicle in accordance with the running information. For example, the eNB may determine that the running direction of the vehicle A is about to intersect the running direction of the vehicle B, the vehicle A has a speed of 20 km/h, and the vehicle B has a speed of 20 km/h, a turning radius of 1000 m and an angular variation of 5°/s. In other words, each of the vehicles A and B is running at a constant speed, so the movement trend between the vehicles A and B indicates that the distance decreases. The predetermined spatial multiplexing distance is 900 m, so the distance between the vehicles A and B meets the requirement on the spatial multiplexing distance. However, because the movement trend between the vehicles A and B indicates that the distance decreases, the eNB may determine that the time-frequency resources are incapable of being spatially multiplexed between the vehicles A and B.

Based on an identical inventive concept, the present disclosure further provides in some embodiments a scheduling platform and a node for implementing the above-mentioned methods.

Figure 10:
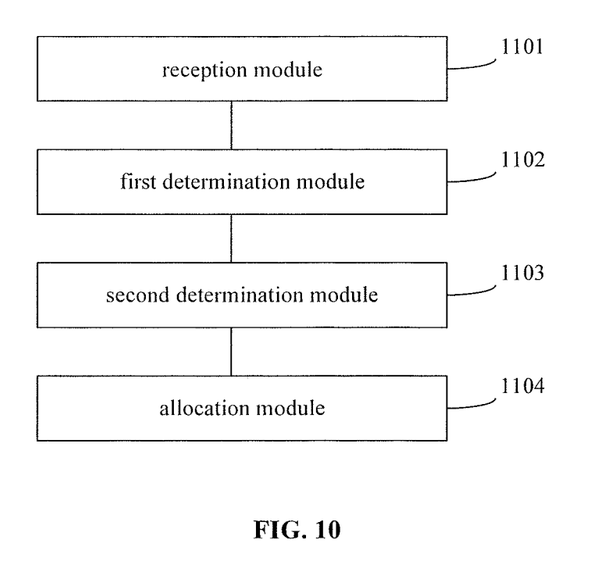
FIG. 10 is a schematic view showing a resource scheduling device according to one embodiment of the present disclosure.

The present disclosure provides in some embodiments a resource scheduling device for a vehicle infrastructure cooperative communication system, and it may be provided in one or more base stations. As shown in FIG. 10, the resource scheduling device includes: a reception module 1101 configured to receive node position information from nodes of the vehicle infrastructure cooperative communication system; a first determination module 1102 configured to calculate a distance between the nodes in accordance with the node position information, and determine a movement trend between the nodes, the movement trend indicating that the distance decreases, remains unchanged or increases; a second determination module 1103 configured to, in the case that the movement trend indicates that the distance decreases or increases, determine whether or not spatial-multiplexed time-frequency resources are capable of being used for the nodes in accordance with the distance between the nodes and the movement trend, so as to acquire a determination result; and an allocation module 1104 configured to allocate available time-frequency resources for the nodes in accordance with the determination result.

In a possible embodiment of the present disclosure, the allocation module 1104 is further configured to, in the case that the movement trend indicates that the distance remains unchanged, maintain the time-frequency resources currently allocated for a first node and a second node.

In a possible embodiment of the present disclosure, the second determination module 1103 includes: a first output module configured to, in the case that the movement trend indicates that the distance increases and a current distance between the first node and the second node is greater than a predetermined spatial multiplexing distance threshold, determine that the spatial-multiplexed time-frequency resources are capable of being used for the first node and the second node, otherwise determine that the spatial-multiplexed time-frequency resources are incapable of being used for the first node and the second node; and a second output module configured to, in the case that the movement trend indicates that the distance decreases and the current distance between the first node and the second node is greater than a first sum, determine that the spatial-multiplexed time-frequency resources are capable of being used for the first node and the second node, otherwise determine that the spatial-multiplexed time-frequency resources are incapable of being used for the first node and the second node, the first sum being a sum of the spatial multiplexing distance threshold and a predetermined buffer distance.

In a possible embodiment of the present disclosure, the allocation module 1104 includes: a first allocation sub-module configured to, in the case that the spatial-multiplexed time-frequency resources are capable of being used for the first node and the second node, allocate an identical time-frequency resource for the first node and the second node; and a second allocation sub-module configured to, in the case that the spatial-multiplexed time-frequency resources are incapable of being used for the first node and the second node, allocate different time-frequency resources for the first node and the second node.

In a possible embodiment of the present disclosure, the movement trend between the nodes may be determined in accordance with the node position information. At this time, the first determination module 1102 includes: a first calculation module configured to calculate a distance between the first node and the second node in accordance with node position information about the first node and the second node; and a first acquisition module configured to determine a variation trend of the distance in accordance with the distances acquired after two calculation operations, so as to acquire the movement trend between the first node and the second node.

In a possible embodiment of the present disclosure, the movement trend between the nodes may be determined in accordance with the node position information and the node running information. At this time, the reception module 1101 is further configured to, in the case of receiving the node position information from the nodes of the vehicle infrastructure cooperative communication system, receive node running information from the nodes of the vehicle infrastructure cooperative communication system, the node running information at least including a movement speed of each node. The first determination module 1102 includes: a second calculation module configured to determine a relative speed of the first node relative to the second node in accordance with a speed of the first node and a speed of the second node; and a second acquisition module configured to determine the movement trend between the first node and the second node in accordance with the relative speed of the first node relative to the second node.

Figure 11:
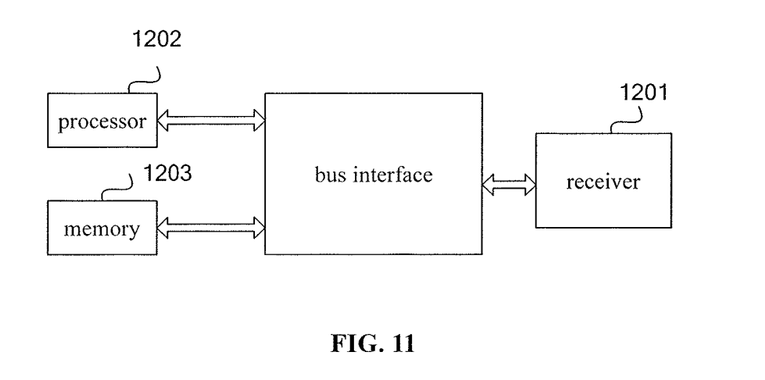
FIG. 11 is another schematic view showing the resource scheduling device according to one embodiment of the present disclosure.

The present disclosure further provides in some embodiments a resource scheduling device for a vehicle infrastructure cooperative communication system which, as shown in FIG. 11, includes a receiver 1201, a processor 1202 and a memory 1203. The receiver 1201 is configured to receive node position information from nodes of the vehicle infrastructure cooperative communication system. The processor 1202 is configured to read programs stored in the memory 1203, so as to: calculate a distance between the nodes in accordance with the node position information, and determine a movement trend between the nodes, the movement trend indicating that the distance decreases, remains unchanged or increases; in the case that the movement trend indicates that the distance decreases or increases, determine whether or not spatial-multiplexed time-frequency resources are capable of being used for the nodes in accordance with the distance between the nodes and the movement trend, so as to acquire a determination result; and allocate available time-frequency resources for the nodes in accordance with the determination result. The memory 1203 is configured to store therein the node position information from the nodes, the node running information, and data acquired by the processor 1202 during the calculation (e.g., the distance between the nodes, a speed of each node and an accelerated speed of each node).

The processor 1202 and the memory 1203 are connected to the receiver 1201 via a bus interface. Bus architecture may include a number of buses and bridges connected to each other, so as to connect various circuits for one or more processors 1202 and one or more memories 1203. In addition, as is known in the art, the bus architecture 1000 may be used to connect any other circuits, such as a circuit for a peripheral device, a circuit for a voltage stabilizer and a power management circuit, which are not particularly defined herein. Bus interfaces are provided, and the receiver 1201 may consist of a plurality of elements for communication with any other devices over a transmission medium. The processor 1202 may take charge of managing the bus architecture as well general processings, e.g., running a general-purpose operating system. The memory 1203 may store data therein for the operation of the processor.

Figure 12:
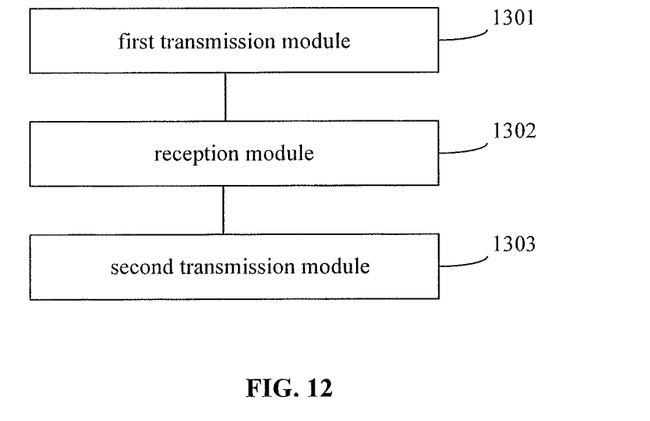
FIG. 12 is a schematic view showing a node according to one embodiment of the present disclosure.

The present disclosure further provides in some embodiments a node of a vehicle infrastructure cooperative communication system, and the node may be a vehicle or a device within the vehicle. As shown in FIG. 12, the node includes: a first transmission module 1301 configured to report node position information about the node to a scheduling platform; a reception module 1302 configured to receive a time-frequency resource allocated by the scheduling platform for the node, the time-frequency resource being allocated by the scheduling platform for the node in accordance with a distance between the node and another node calculated in accordance with the node position information from the nodes and a movement trend between the nodes; and a second transmission module 1303 configured to transmit information through the time-frequency resource allocated by the scheduling platform.

In a possible embodiment of the present disclosure, the first transmission module 1301 is further configured to, in the case of reporting the node position information about the node to the scheduling platform, report node running information to the scheduling platform so that the scheduling platform determines the movement trend between the nodes in accordance with the node running information, the node running information at least including a movement speed of each node.

Figure 13:
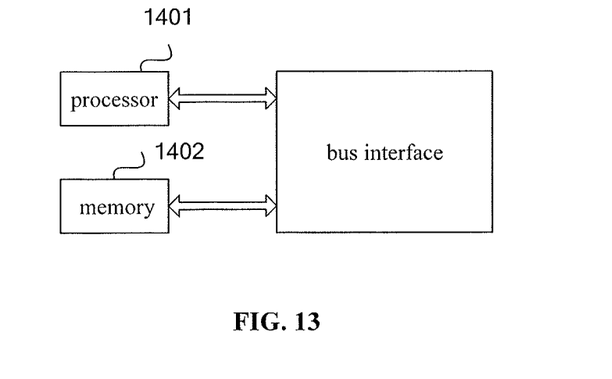
FIG. 13 is another schematic view showing the node according to one embodiment of the present disclosure.

The present disclosure further provides in some embodiments a node of a vehicle infrastructure cooperative communication system which, as shown in FIG. 13, includes a processor 1401 and a memory 1402. The processor 1401 is configured to read programs stored in the memory 1402, so as to: report node position information about the node to a scheduling platform; receive a time-frequency resource allocated by the scheduling platform for the node, the time-frequency resource being allocated by the scheduling platform for the node in accordance with a distance between the node and another node calculated in accordance with the node position information from the nodes and a movement trend between the nodes; and transmit information through the time-frequency resource allocated by the scheduling platform. The memory 1402 is configured to store therein data for the operation of the processor 1401.

The processor 1401 and the memory 1402 are connected to each other via a bus interface, and bus architecture may include a number of buses and bridges connected to each other.

It should be appreciated that, all of, or parts of, the steps may be implemented through hardware, or through hardware in conjunction with computer programs. The computer programs may include instructions so as to execute all or parts of the steps. In addition the computer programs may be stored in a computer-readable storage medium, and the computer-readable storage medium may be a nontransient storage medium in any form.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A resource scheduling method for a vehicle infrastructure cooperative communication system, applied to a scheduling platform in the vehicle infrastructure cooperative communication system, comprising:
   receiving node position information from nodes of the vehicle infrastructure cooperative communication system;
   calculating a distance between any two nodes among the nodes of the vehicle infrastructure cooperative communication system in accordance with the node position information, and determining a movement trend between the any two nodes, the movement trend indicating that the distance decreases, remains unchanged or increases;
   in the case that the movement trend indicates that the distance decreases or increases, determining whether or not spatial-multiplexed time-frequency resources are capable of being used for the any two nodes in accordance with the distance between the any two nodes and the movement trend, so as to acquire a determination result;
   in the case that the movement trend indicates that the distance increases and a current distance between the first node and the second node is greater than a predetermined spatial multiplexing distance threshold, determining that the spatial-multiplexed time-frequency resources are capable of being used for the first node and the second node, otherwise determining that the spatial-multiplexed time-frequency resources are incapable of being used for the first node and the second node; and
   in the case that the movement trend indicates that the distance decreases and the current distance between the first node and the second node is greater than a first sum, determining that the spatial-multiplexed time-frequency resources are capable of being used for the first node and the second node, otherwise determining that the spatial-multiplexed time-frequency resources are incapable of being used for the first node and the second node, the first sum being a sum of the spatial multiplexing distance threshold and a predetermined buffer distance; and
   allocating available time-frequency resources for the nodes of the vehicle infrastructure cooperative communication system in accordance with the determination result.

2. The resource scheduling method according to claim 1, wherein subsequent to the step of determining the movement trend between the any two nodes, the resource scheduling method further comprises, in the case that the movement trend indicates that the distance remains unchanged, maintaining the time-frequency resources currently allocated for a first node and a second node.

3. The resource scheduling method according to claim 1, wherein the step of allocating the available time-frequency resources for the nodes in accordance with the determination result comprises:
   in the case that the spatial-multiplexed time-frequency resources are capable of being used for the first node and the second node, allocating an identical time-frequency resource for the first node and the second node; and
   in the case that the spatial-multiplexed time-frequency resources are incapable of being used for the first node and the second node, allocating different time-frequency resources for the first node and the second node.

4. The resource scheduling method according to claim 1, wherein the step of calculating the distance between the any two nodes in accordance with the node position information and determining the movement trend between the any two nodes comprises:
   calculating a distance between the first node and the second node in accordance with node position information about the first node and the second node; and
   determining a variation trend of the distance in accordance with the distances acquired after two calculation operations, so as to acquire the movement trend between the first node and the second node.

5. The resource scheduling method according to claim 1, wherein in the case of receiving the node position information from the any two nodes of the vehicle infrastructure cooperative communication system, the resource scheduling method further comprises receiving node running information from the any two nodes of the vehicle infrastructure cooperative communication system, the node running information at least including a movement speed of each node, and
   the step of calculating the distance between the nodes in accordance with the node position information and determining the movement trend between the any two nodes comprises:
   calculating a distance between the first node and the second node in accordance with node position information about the first node and the second node; and
   determining the movement trend between the first node and the second node in accordance with the node position information about the first node and the second node and the node running information.

6. The resource scheduling method according to claim 5, wherein the step of determining the movement trend between the first node and the second node in accordance with the node position information about the first node and the second node and the node running information comprises:

determining a relative speed of the first node relative to the second node in accordance with a speed of the first node and a speed of the second node; and determining the movement trend between the first node and the second node in accordance with the relative speed of the first node relative to the second node.

7. A resource scheduling method for a vehicle infrastructure cooperative communication system, comprising steps of:

reporting, by each node of the vehicle infrastructure cooperative communication system, node position information about the node to a scheduling platform;

receiving, by each node, a time-frequency resource allocated by the scheduling platform for the node, the time-frequency resource being allocated by the scheduling platform for the node in accordance with a distance between any two nodes among the nodes of the vehicle infrastructure cooperative communication system calculated in accordance with the node position information from the any two nodes and a movement trend between the any two nodes, the movement trend indicating that the distance decreases, remains unchanged or increases, wherein in the case that the movement trend indicates that the distance decreases or increases; and transmitting, by each node, information through the time-frequency resource allocated by the scheduling platform, wherein in the case that the movement trend indicates that the distance decreases or increases, the resource scheduling method further comprises determining whether or not spatial-multiplexed time-frequency resources are to be used for the any two nodes in accordance with the distance between the any two nodes and the movement trend, so as to acquire a determination result, such that each node transmits the information through the time-frequency resource allocated by the scheduling platform in accordance with the determination result;

in the case that the movement trend indicates that the distance increases and a current distance between the first node and the second node is greater than a predetermined spatial multiplexing distance threshold, determining that the spatial-multiplexed time-frequency resources are capable of being used for the first node and the second node, otherwise determining that the spatial-multiplexed time-frequency resources are incapable of being used for the first node and the second node; and in the case that the movement trend indicates that the distance decreases and the current distance between the first node and the second node is greater than a first sum, determining that the spatial-multiplexed time-frequency resources are capable of being used for the first node and the second node, otherwise determining that the spatial-multiplexed time-frequency resources are incapable of being used for the first node and the second node, the first sum being a sum of the spatial multiplexing distance threshold and a predetermined buffer distance.

8. The resource scheduling method according to claim 7, wherein in the case of reporting, by each node, the node position information about the node to the scheduling platform, the resource scheduling method further comprises reporting, by each node, node running information to the scheduling platform so that the scheduling platform determines the movement trend between the nodes in accordance with the node running information, the node running information at least including a movement speed of each node.

9. A resource scheduling device for a vehicle infrastructure cooperative communication system, comprising a receiver, a processor and a memory, wherein the receiver is configured to receive node position information from nodes of the vehicle infrastructure cooperative communication system, the processor is configured to read programs stored in the memory, so as to: calculate a distance between the nodes in accordance with the node position information, and determine a movement trend between any two nodes, the movement trend indicating that the distance decreases, remains unchanged or increases; in the case that the movement trend indicates that the distance decreases or increases, determine whether or not spatial-multiplexed time-frequency resources are capable of being used for the any two nodes in accordance with the distance between the any two nodes and the movement trend, so as to acquire a determination result; and allocate available time-frequency resources for the nodes of the vehicle infrastructure cooperative communication system in accordance with the determination result;

in the case that the movement trend indicates that the distance increases and a current distance between the first node and the second node is greater than a predetermined spatial multiplexing distance threshold, determining that the spatial-multiplexed time-frequency resources are capable of being used for the first node and the second node, otherwise determining that the spatial-multiplexed time-frequency resources are incapable of being used for the first node and the second node; and in the case that the movement trend indicates that the distance decreases and the current distance between the first node and the second node is greater than a first sum, determining that the spatial-multiplexed time-frequency resources are capable of being used for the first node and the second node, otherwise determining that the spatial-multiplexed time-frequency resources are incapable of being used for the first node and the second node, the first sum being a sum of the spatial multiplexing distance threshold and a predetermined buffer distance; and the memory is configured to store therein data for the operation of the processor.

10. The resource scheduling device according to claim 9, wherein subsequent to the process of determining the movement trend between the any two nodes, the resource scheduling device is further configured to, in the case that the movement trend indicates that the distance remains unchanged, maintain the time-frequency resources currently allocated for a first node and a second node.

11. The resource scheduling device according to claim 9, wherein the process of allocating the available time-frequency resources for the nodes of the vehicle infrastructure cooperative communication system in accordance with the determination result comprises:

in the case that the spatial-multiplexed time-frequency resources are capable of being used for the first node and the second node, allocating an identical time-frequency resource for the first node and the second node; and in the case that the spatial-multiplexed time-frequency resources are incapable of being used for the first node and the second node, allocating different time-frequency resources for the first node and the second node.

12. The resource scheduling device according to claim 9, wherein the process of calculating the distance between the any two nodes in accordance with the node position information and determining the movement trend between the any two nodes comprises:
calculating a distance between the first node and the second node in accordance with node position information about the first node and the second node; and
determining a variation trend of the distance in accordance with the distances acquired after two calculation operations, so as to acquire the movement trend between the first node and the second node.

13. The resource scheduling device according to claim 9, wherein in the case of receiving the node position information from the nodes of the vehicle infrastructure cooperative communication system, the resource scheduling device is further configured to receive node running information from the nodes of the vehicle infrastructure cooperative communication system, the node running information at least including a movement speed of each node, and
the process of calculating the distance between the any two nodes in accordance with the node position information and determining the movement trend between the any two nodes comprises:
calculating a distance between the first node and the second node in accordance with node position information about the first node and the second node; and
determining the movement trend between the first node and the second node in accordance with the node position information about the first node and the second node and the node running information.

14. The resource scheduling device according to claim 13, wherein the process of determining the movement trend between the first node and the second node in accordance with the node position information about the first node and the second node and the node running information comprises:
determining a relative speed of the first node relative to the second node in accordance with a speed of the first node and a speed of the second node; and
determining the movement trend between the first node and the second node in accordance with the relative speed of the first node relative to the second node.

15. A node of a vehicle infrastructure cooperative communication system, comprising a processor and a memory, wherein the processor is configured to read programs stored in the memory, so as to: report node position information about the node to a scheduling platform; receive a time-frequency resource allocated by the scheduling platform for the node, the time-frequency resource being allocated by the scheduling platform for the node in accordance with a distance between the node and another node calculated in accordance with the node position information from the any two nodes and a movement trend between the any two nodes, the movement trend indicating that the distance decreases, remains unchanged or increases, wherein in the case that the movement trend indicates that the distance decreases or increases; and transmit information through the time-frequency resource allocated by the scheduling platform, and
the memory is configured to store therein data for the operation of the processor,
wherein in the case that the movement trend indicates that the distance decreases or increases, the processor is further configured to determine whether or not spatial-multiplexed time-frequency resources are to be used for the any two nodes in accordance with the distance between the any two nodes and the movement trend, so as to acquire a determination result, such that each node transmits the information through the time-frequency resource allocated by the scheduling platform in accordance with the determination result;
in the case that the movement trend indicates that the distance increases and a current distance between the first node and the second node is greater than a predetermined spatial multiplexing distance threshold, determining that the spatial-multiplexed time-frequency resources are capable of being used for the first node and the second node, otherwise determining that the spatial-multiplexed time-frequency resources are incapable of being used for the first node and the second node; and
in the case that the movement trend indicates that the distance decreases and the current distance between the first node and the second node is greater than a first sum, determining that the spatial-multiplexed time-frequency resources are capable of being used for the first node and the second node, otherwise determining that the spatial-multiplexed time-frequency resources are incapable of being used for the first node and the second node, the first sum being a sum of the spatial multiplexing distance threshold and a predetermined buffer distance.

16. The node according to claim 15, wherein in the case of reporting, by each node, the node position information about the node to the scheduling platform, the node is further configured to report, by each node, node running information to the scheduling platform so that the scheduling platform determines the movement trend between the nodes in accordance with the node running information, the node running information at least including a movement speed of each node.

* * * * *